(12) United States Patent
Kuo et al.

(10) Patent No.: US 11,945,885 B1
(45) Date of Patent: Apr. 2, 2024

(54) VINYL-CONTAINING COPOLYMER AND RESIN COMPOSITION

(71) Applicant: INDUSTRIAL TECHNOLOGY RESEARCH INSTITUTE, Hsinchu (TW)

(72) Inventors: Cheng-Po Kuo, Taipei (TW); Shin-Liang Kuo, Hsinchu (TW); Shu-Chuan Huang, Zhubei (TW); Yan-Ting Jiang, Hsinchu (TW); Jian-Yi Hang, Zhonghe (TW); Wen-Sheng Chang, Zaoqiao Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 18/147,974

(22) Filed: Dec. 29, 2022

(30) Foreign Application Priority Data

Dec. 23, 2022 (TW) .................................. 111149628

(51) Int. Cl.
*C08F 12/08* (2006.01)
*C08F 222/10* (2006.01)
*C08F 236/06* (2006.01)
*C08G 65/48* (2006.01)

(52) U.S. Cl.
CPC .......... *C08F 12/08* (2013.01); *C08F 222/102* (2020.02); *C08F 236/06* (2013.01); *C08G 65/485* (2013.01); *C08G 2650/04* (2013.01)

(58) Field of Classification Search
USPC ................................................. 525/303, 310
See application file for complete search history.

(56) References Cited

U.S. PATENT DOCUMENTS 4,330,641 A * 5/1982 Echte .................... C08F 255/06
525/310
10,689,469 B2 6/2020 Zheng et al.
2006/0105126 A1 5/2006 Kendig
2006/0105186 A1 5/2006 Kendig
2014/0199549 A1 7/2014 Shin
2019/0292326 A1 * 9/2019 Chang ...................... C08F 2/40
2022/0135844 A1 5/2022 Rahme et al.

FOREIGN PATENT DOCUMENTS

| CN | 1859232 A | 6/2005 |
| CN | 1914239 B | 5/2010 |
| CN | 101641380 B | 9/2013 |
| CN | 103865405 B | 6/2016 |
| CN | 104968690 B | 2/2018 |
| CN | 110218436 A | 9/2019 |
| CN | 107075301 B | 4/2020 |
| TW | I529182 B | 4/2016 |
| TW | 202219174 A | 5/2022 |

OTHER PUBLICATIONS

Machine-assisted translation of CN 110218436-A, 16 pages, published Sep. 2019; retrieved from ESPACENET on Nov. 17, 2023. (Year: 2019).*
Machine-assisted translation of CN 114437532-A, 7 pages, published May 2022; retrieved from ESPACENET on Nov. 17, 2023. (Year: 2022).*
Taiwanese Office Action and Search Report for Taiwanese Application No. 111149628, dated Oct. 23, 2023.
Viala et al., "Structural control in radical polymerization with 1,1 diphenylethylene: 2. Behavior of MMA-DPE copolymer in radical polymerization", Polymer, 2003, vol. 44, p. 1339-1351.

* cited by examiner

*Primary Examiner* — Fred M Teskin
(74) *Attorney, Agent, or Firm* — Birch, Stewart, Kolasch & Birch, LLP

(57) ABSTRACT

A vinyl-containing copolymer is copolymerized from (a) first compound, (b) second compound, and (c) third compound. (a) First compound is an aromatic compound having a single vinyl group. (b) Second compound is polybutadiene or polybutadiene-styrene having side vinyl groups. (c) Third compound is an acrylate compound. The vinyl-containing copolymer includes 0.003 mol/g to 0.010 mol/g of benzene ring, 0.0005 mol/g to 0.008 mol/g of vinyl group, and $1.2 \times 10^{-5}$ mol/g to $2.4 \times 10^{-4}$ mol/g of ester group.

10 Claims, No Drawings

VINYL-CONTAINING COPOLYMER AND RESIN COMPOSITION

CROSS REFERENCE TO RELATED APPLICATIONS

The present application is based on, and claims priority from, Taiwan Application Serial Number 111149628, filed on Dec. 23, 2022, the disclosure of which is hereby incorporated by reference herein in its entirety.

TECHNICAL FIELD

The technical field relates to a resin composition and a copolymer included in the resin composition.

BACKGROUND

The electronic communications industry is developing rapidly at the present time, and is developing towards producing high-speed, high-frequency and high-density products. Low dielectric materials are the main development of electronic construction and high-frequency and high-speed substrate materials to satisfy the requirements of high-speed information processing. Polyphenylene oxide oligomer is one of the main resins used in manufacturing high-frequency copper clad laminate (CCL), but the CCL made of only polyphenylene oxide oligomer cannot satisfy the requirements for high-frequency and low Df (dissipation factor) CCL materials in the next generation of products, such as low Df (e.g. Df<0.004@ 10 GHz), high glass transition temperature (Tg, e.g. ≥200° C.), and high peeling strength to copper foil (e.g. ≥3.0 lb/in). In summary, there is an urgent need for low Df materials with excellent thermal properties and high peel strength to copper foil.

SUMMARY

One embodiment of the disclosure provides a vinyl-containing copolymer, being copolymerized from (a) first compound, (b) second compound, and (c) third compound, wherein (a) first compound is an aromatic compound having a single vinyl group; (b) second compound is polybutadiene or polybutadiene-styrene having side vinyl groups; and (c) third compound is an acrylate compound, wherein the vinyl-containing copolymer includes 0.003 mol/g to 0.012 mol/g of benzene ring, 0.0005 mol/to 0.012 mol/g of vinyl group, and $1*10^{-5}$ mol/g to $2.8*10^{-4}$ mol/g of ester group.

One embodiment of the disclosure provides a resin composition, including a vinyl-containing copolymer and a radical initiator. The vinyl-containing copolymer is copolymerized from (a) first compound, (b) second compound, and (c) third compound. (a) First compound is an aromatic compound having a single vinyl group. (b) Second compound is polybutadiene or polybutadiene-styrene having side vinyl groups. (c) Third compound is an acrylate compound. The vinyl-containing copolymer includes 0.003 mol/g to 0.012 mol/g of benzene ring, 0.0005 mol/g to 0.012 mol/g of vinyl group, and $1*10^{-5}$ mol/g to $2.8*10^{-4}$ mol/g of ester group.

A detailed description is given in the following embodiments.

DETAILED DESCRIPTION

In the following detailed description, for the purposes of explanation, numerous specific details are set forth in order to provide a thorough understanding of the disclosed embodiments. It will be apparent, however, that one or more embodiments may be practiced without these specific details.

One embodiment of the disclosure provides a vinyl-containing copolymer, being copolymerized from (a) first compound, (b) second compound, and (c) third compound. In some embodiments, (a) first compound is an aromatic compound having a single vinyl group for improving, the solubility in solvent and the processability of the copolymer. In some embodiments, (a) first compound has a chemical structure of

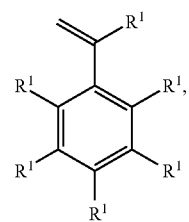

wherein each of $R^1$ is independently H or $C_{1-10}$ alkyl group. For example, the aromatic compound having a single vinyl group can be styrene, methyl styrene, ethyl styrene, the like, or a combination thereof.

In some embodiments, (b) second compound is polybutadiene or polybutadiene-styrene having side vinyl groups. In some embodiments, (b) second compound has a chemical structure of

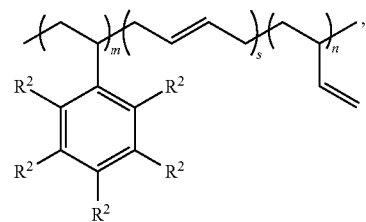

wherein each of $R^2$ is independently H or $C_{1-10}$ alkyl group, m is 0 to 50, s is 0 to 100, and n is 1 to 100, wherein (b) second compound has a number average molecular weight of 300 to 15000.

In some embodiments, the polybutadiene or polybutadiene-styrene having side vinyl groups may include a polybutadiene having a side vinyl group content of 10% to 95% and a number average molecular weight of 1400 to 6000; or a polybutadiene-styrene having a side vinyl group content of 10% to 95%, a styrene content of 5% to 60%, and a number average molecular weight of 1400 to 6000. For example, the polybutadiene or polybutadiene-styrene having side vinyl groups may include a polybutadiene having a side vinyl group content of 40% to 70% and a number average molecular weight of 2000 to 6000; a polybutadiene having a side vinyl group content of 10% to 50% and a number average molecular weight of 2500 to 8000; a polybutadiene having a side vinyl group content of 70% to 95% and a number average molecular weight of 1400 to 3900; a polybutadiene having a side vinyl group content of 80% to 95% and a number average molecular weight of 2900 to 5200; a polybutadiene-styrene having a side vinyl group content of 10% to 50%, a styrene content of 10% to 50%, and a number average molecular weight of 2000 to 9000; a polybutadiene-styrene having a side vinyl group content of 55% to 95%, a styrene content of 5% to 60%, and a number average molecular weight of 1000 to 8000; or a combination thereof.

For example, (b) second compound can be Ricon130, Ricon131, Ricon134, Ricon142, Ricon144, Ricon150, Ricon152, Ricon153, Ricon154, Ricon156, Ricon157, Ricon100, Ricon181, or Ricon184 commercially available from Cray valley, or a combination thereof; or Lithene Ultra® AL, Lithene Ultra® AH, Lithene Ultra® PH, Lithene Ultra® PM4, or Lithene Ultra® P4-150P commercially available from Synthomer, or a combination thereof.

In some embodiments, the polybutadiene-styrene can be Ricon100 commercially available from Cray valley, which has a side vinyl group (reactive vinyl group) content of 70%, a styrene content of 25%, and a number average molecular weight of 4500. In some embodiments, the polybutadiene-styrene can be Ricon181 commercially available from Cray valley, which has a side vinyl group (reactive vinyl group) content of 30%, a styrene content of 28%, and a number average molecular weight of 3200. In some embodiments, the polybutadiene can be Lithene Ultra® AL commercially available from Synthomer, which has a side vinyl group (reactive vinyl group) content of 40% to 55% and a number average molecular weight of 700.

In some embodiments, (c) third compound is an acrylate compound. In some embodiments, (c) third compound has a chemical structure of

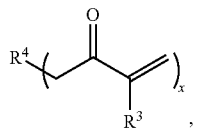

wherein $R^3$ is H or methyl group, x is 1 to 3, and $R^4$ is

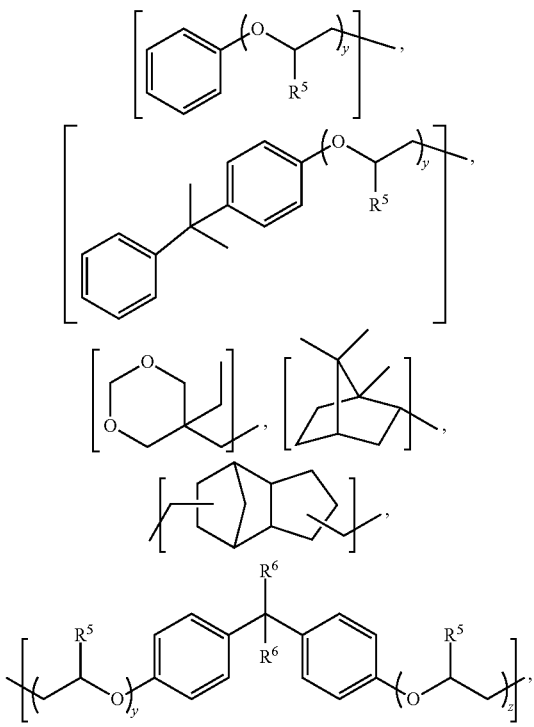

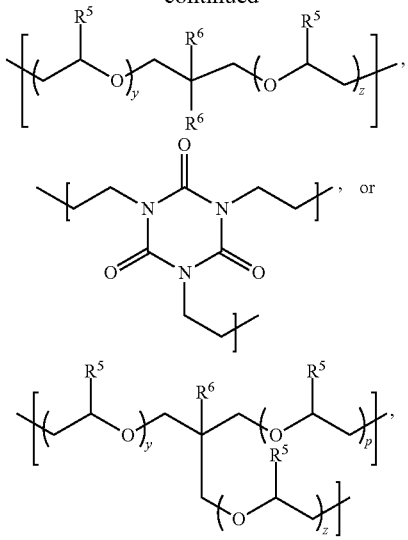

wherein each of $R^5$ and $R^6$ is independently H or $C_{1-10}$ alkyl group, y is 1 to 10, z is 0 to 10, and p is 0 to 10. The acrylate compound can be diacrylate compound such as cyclohexane dimethanol di(meth)acrylate, dimethyloltricyclodecane di(meth)acrylate, ethylene glycol di(meth)acrylate, propylene glycol di(meth)acrylate, 1,4-butylene glycol di(meth)acrylate, hexylene glycol di(meth)acrylate, diethylene glycol di(meth)acrylate, polyethylene glycol di(meth)acrylate, tripropylene glycol di(meth)acrylate, caprolactone modified hydroxytrimethyl acetic acid neopentyl glycol di(meth)acrylate, or a combination thereof. For example, the diacrylate compound can be EM2204 commercially available from Eternal Materials Co. Ltd, such as dimethyloltricyclodecane diacrylate. The acrylate compound can be single acrylate compound such as methyl methacrylate, ethyl methacrylate, 2-hydroxyethyl methacrylate, methyl acrylate, ethyl acrylate, n-butyl acrylate, 2-methylhexyl acrylate, 2-ethylhexyl acrylate, octyl acrylate, isobornyl (meth)acrylate, dicyclopentenyl (meth)acrylate, dicyclopentanyl (meth)acrylate, dicyclopentenyloxyethyl (meth)acrylate, dicyclopentanyloxyethyl (meth)acrylate, phenoxypolyethylene glycol acrylate, ethoxylated o-phenylphenyl ether acrylate, nonylphenol ethoxy-modified acrylate, or a combination thereof. For example, the single acrylate compound can be EM70 commercially available from Eternal Materials Co., Ltd, such as isobornyl methacrylate. The acrylate compound can be multi-acrylate compound such as trimethylolpropane tri(meth)acrylate, trimethylolpropane trioxyethyl (meth)acrylate, tris(2-hydroxyethyl)isocyanate tri(meth)acrylate, pentaerythritol tri(meth)acrylate, pentaerythritol tetra(meth)acrylate, dipentaerythritol hexa(meth)acrylate, or urethane poly(meth)acrylate, epoxy (meth)acrylate, polyester (meth)acrylate, or a combination thereof.

In some embodiments, the vinyl-containing copolymer is not prone to gel, and has suitable solubility in solvent and suitable processability in further applications. Moreover, the thermal resistance and low Df property of the vinyl-containing copolymer is suitable for advanced manufacturing processes.

In some embodiments, the vinyl-containing copolymer includes 0.003 mol/g to 0.012 mol/g of benzene ring, 0.0005 mol/g to 0.012 mol/g of vinyl group, and $1*10^{-5}$ mol/g to $2.8*10^{-4}$ mol/g of ester group. In some embodiments, the contents of the benzene ring, the vinyl group, and the ester group is determined by the ratio of (a) first compound to (b) second compound to (c) third compound, the reaction temperature, and the reaction period. In some embodiments, the vinyl-containing copolymer includes 0.003 mol/g to 0.010 mol/g of benzene ring, 0.0005 mol/g to 0.008 mol/g of vinyl group, and $1.2*10^{-5}$ mol/g to $2.4*10^{-4}$ mol/g of ester group. On the other hand, the reaction can be performed at a temperature of 60° C. to 120° C. for a period of 30 minutes to 300 minutes. If the reaction temperature is too low or reaction period is too short, the monomers cannot completely react. If the reaction temperature is too high or the reaction period is too long, the reaction will be easily over-crosslinked to gel.

The benzene ring is derived from the benzene ring of (a) first compound and (b) second compound, the vinyl group is derived from the side vinyl group of (b) second compound, and the ester group is derived from the ester group of (c) third compound. The benzene ring may improve the thermal resistance of an insulation layer formed from the resin composition containing the copolymer. If the benzene ring content of the copolymer is too low, the insulation layer will have an insufficient thermal resistance. If the benzene ring content of the copolymer is too high, the copper clad laminate will be brittle. The vinyl group may increase the crosslink degree of the resin composition, thereby increasing the thermal resistance of the insulation layer and decreasing the Df of the insulation layer. If the vinyl group content of the copolymer is too low, the insulation layer will have an insufficient thermal resistance and a dissipation factor that is too high. If the vinyl group content of the copolymer is too high, the copper clad laminate will be sticky. The ester group may increase the peeling strength of the insulation layer to the copper foil. If the ester group content of the copolymer is too low, the copper foil will be easily peeled from the insulation layer. If the ester group content is too high, it will form a substrate having poor electric properties.

One embodiment of the disclosure provides a resin composition, including a vinyl-containing copolymer and a radical initiator. The vinyl-containing copolymer is similar to that described above, and the related description is omitted and not repeated here. In some embodiments, the resin composition further includes a terminal double bond-containing polyphenylene oxide resin, and the vinyl-containing copolymer and the terminal double bond-containing polyphenylene oxide resin have a weight ratio of 90:10 to 10:90. The terminal double bond-containing polyphenylene oxide resin may further crosslink with the vinyl-containing copolymer to form an insulation layer with excellent thermal properties. If the amount of the terminal double bond-containing polyphenylene oxide resin is too low, the resin composition will be similar to the resin composition without the terminal double bond-containing polyphenylene oxide resin. If the amount of the terminal double bond-containing polyphenylene oxide resin is too high, it will form a substrate having poor electric properties. In some embodiments, the terminal double bond-containing polyphenylene oxide resin includes terminal methacryloxy group-containing polyphenylene oxide resin, terminal vinyl benzyl ether-containing polyphenylene oxide resin, or a combination thereof.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

In following Examples, the benzene ring, the contents of vinyl group, and the ester group in the copolymer were measured through proton nuclear magnetic resonance spectroscopy ($^1$H-NMR, 400 MHz) with a solvent of deuterated chloroform ($CDCl_3$) and an internal standard of butyl acetate. The contents (mol/g) of the functional groups in the samples were calculated on the basis of the known mole of butyl acetate. The benzene ring was derived from the benzene ring of (a) first compound and (b) second compound, the vinyl group was derived from the side vinyl group of (b) second compound, and the ester group was derived from the ester group of (c) third compound.

Example 1

Styrene (100 g, 0.96 mol), polybutadiene-styrene Ricon100 (commercially available from Cray valley, having a number average molecular weight of 4500, having a side-vinyl group content of 70%, and a styrene content of 25%, 60 g), dimethyloltricyclodecane diacrylate EM2204 (commercially available from Eternal Materials Co., Ltd, 6 g, 0.02 mol), AIBN (2.5 g, 0.0152 mol), and toluene (85 g) were added into a reactor to be heated to 90° C. to react for 3 hours, and then cooled to room temperature and poured into methanol to precipitate solid. The solid was collected by filtering, and the filtered cake was dried under vacuum to obtain 126 g of white copolymer P1 including 0.004 mol/g of benzene ring, 0.008 mol/g of vinyl group, and $0.64*10^{-4}$ mol/g of ester group.

Example 2

Styrene (140 g, 1.34 mol), polybutadiene-styrene Ricon100 (40 g), dimethyloltricyclodecane diacrylate EM2204 (8 g, 0.027 mol), AIBN (2.8 g, 0.0171 mol), and toluene (95 g) were added into a reactor to be heated to 90° C. to react for 3 hours, and then cooled to room temperature and poured into methanol to precipitate solid. The solid was collected by filtering, and the filtered cake was dried under vacuum to obtain 130 g of white copolymer P2 including 0.006 mol/g of benzene ring, 0.005 mol/g of vinyl group, and $0.76*10^{-4}$ mol/g of ester group.

Example 3

Styrene (150 g, 1.44 mol), polybutadiene-styrene Ricon100 (40 g), dimethyloltricyclodecane diacrylate EM2204 (14 g, 0.046 mol), AIBN (3.0 g, 0.0183 mol), and toluene (105 g) were added into a reactor to be heated to 90° C. to react for 3 hours, and then cooled to room temperature and poured into methanol to precipitate solid. The solid was collected by filtering, and the filtered cake was dried under vacuum to obtain 130 g of white copolymer P3 including 0.007 mol/g of benzene ring, 0.006 mol/g of vinyl group, and $1.44*10^{-4}$ mol/g of ester group.

Example 4

Styrene (100 g, 0.96 mol), polybutadiene-styrene Ricon181 (commercially available from Cray valley, having a number average molecular weight of 3200, having a side-vinyl group content of 30%, and a styrene content of 28%, 40 g), dimethyloltricyclodecane diacrylate EM2204 (18 g, 0.06 mol), AIBN (2.4 g, 0.0146 mol), and toluene (80 g) were added into a reactor to be heated to 90° C. to react for 3 hours, and then cooled to room temperature and poured into methanol to precipitate solid. The solid was collected by filtering, and the filtered cake was dried under vacuum to obtain 112 g of white copolymer P4 including 0.005 mol/g of benzene ring, 0.003 mol/g of vinyl group, and $2.4*10^{-4}$ mol/g of ester group.

Example 5

Styrene (150 g, 1.44 mol), polybutadiene-styrene Ricon181 (40 g), isobornyl methacrylate EM70 (commercially available from Eternal Materials Co., Ltd, 12 g, 0.058 mol), AIBN (3.0 g, 0.0183 mol), and toluene (105 g) were added into a reactor to be heated to 90° C. to react for 3 hours, and then cooled to room temperature and poured into methanol to precipitate solid. The solid was collected by filtering, and the filtered cake was dried under vacuum to obtain 140 g of white copolymer P5 including 0.006 mol/g of benzene ring, 0.002 mol/g of vinyl group, and $1.08*10^{-4}$ mol/g of ester group.

Example 6

Styrene (140 g, 1.35 mol), polybutadiene Lithene Ultra® AL (commercially available from Synthomer, having a number average molecular weight of 700, having a side-vinyl group content of 40% to 50%, 80 g), dimethyloltricyclodecane diacrylate EM2204 (18 g, 0.06 mol), AIBN (3.5 g, 0.0213 mol), and toluene (120 g) were added into a reactor to be heated to 90° C. to react for 3 hours, and then cooled to room temperature and poured into methanol to precipitate solid. The solid was collected by filtering, and the filtered cake was dried under vacuum to obtain 160 g of white copolymer P6 including 0.005 mol/g of benzene ring, 0.008 mol/g of vinyl group, and $1.48*10^{-4}$ mol/g of ester group.

Example 7

Styrene (220 g, 2.12 mol), polybutadiene-styrene Ricon181 (30 g), dimethyloltricyclodecane diacrylate EM2204 (2 g, 0.007 mol), AIBN (3.7 g, 0.0225 mol), and toluene (130 g) were added into a reactor to be heated to 90° C. to react for 3 hours, and then cooled to room temperature and poured into methanol to precipitate solid. The solid was collected by filtering, and the filtered cake was dried under vacuum to obtain 140 g of white copolymer P7 including 0.009 mol/g of benzene ring, 0.001 mol/g of vinyl group, and $0.12*10^{-4}$ mol/g of ester group.

Comparative Example 1

Styrene (150 g, 1.44 mol), polybutadiene Lithene Ultra® AL (5 g), dimethyloltricyclodecane diacrylate EM2204 (1 g, 0.0033 mol), AIBN (2.3 g, 0.0140 mol), and toluene (80 g) were added into a reactor to be heated to 90° C. to react for 3 hours, and then cooled to room temperature and poured into methanol to precipitate solid. The solid was collected by filtering, and the filtered cake was dried under vacuum to obtain 110 g of white copolymer P8 including 0.009 mol/g of benzene ring, 0.0002 mol/g of vinyl group, and $0.08*10^{-4}$ mol/g of ester group.

Comparative Example 2

Styrene (100 g, 0.96 mol), polybutadiene Lithene Ultra® AL (40 g), dimethyloltricyclodecane diacrylate EM2204 (30 g, 0.10 mol), AIBN (2.5 g, 0.0152 mol), and toluene (85 g) were added into a reactor to be heated to 90° C. to react for 3 hours, and then cooled to room temperature and poured into methanol to precipitate solid. The solid was collected by filtering, and the filtered cake was dried under vacuum to obtain 130 g of white copolymer P9 including 0.006 mol/g of benzene ring, 0.008 mol/g of vinyl group, and $3.08*10^{-4}$ mol/g of ester group.

Comparative Example 3

Styrene (20 g, 0.19 mol), polybutadiene-styrene Ricon100 (100 g), dimethyloltricyclodecane diacrylate EM2204 (12 g, 0.04 mol), AIBN (2.0 g, 0.0122 mol), and toluene (70 g) were added into a reactor to be heated to 90° C. to react for 3 hours, and then cooled to room temperature and poured into methanol to precipitate solid. The solid was collected by filtering, and the filtered cake was dried under vacuum to obtain 110 g of white copolymer P10 including 0.002 mol/g of benzene ring, 0.009 mol/g of vinyl group, and $1.44*10^{-4}$ mol/g of ester group.

Comparative Example 4

Styrene (100 g, 0.96 mol), divinylbenzene (60 g, 0.46 mol), AIBN (2.4 g, 0.0146 mol), and toluene (80 g) were added into a reactor to be heated to 90° C. to react for 3 hours, and then cooled to room temperature and poured into methanol to precipitate solid. The solid was collected by filtering, and the filtered cake was dried under vacuum to obtain 120 g of white copolymer P11 including 0.008 mol/g of benzene ring and 0.002 mol/g of vinyl group.

Comparative Example 5

Polybutadiene-styrene Ricon100 (100 g), dimethyloltricyclodecane diacrylate EM2204 (12 g, 0.04 mol), AIBN (1.7 g, 0.0104 mol), and toluene (55 g) were added into a reactor to be heated to 90° C. to react for 3 hours, and then cooled to room temperature and poured into methanol to precipitate solid. The solid was collected by filtering, and the filtered cake was dried under vacuum to obtain 95 g of white copolymer P12 including 0.0015 mol/g of benzene ring, 0.009 mol/g of vinyl group, and $1.44*10^{-4}$ mol/g of ester group.

Example 8

18 g of the copolymer P1, 24 g of the terminal vinyl benzyl ether-containing polyphenylene oxide resin SA9000 (commercially available from SABIC), and 45 g of toluene were heated and stirred to dissolve. After the substances were completely dissolved, the solution was cooled to room temperature. 6 g of triallylisocyanurate (TAIC) and 3 g of dicumyl peroxide were added into the solution and stirred until being completely dissolved to obtain resin composition E1 as varnish. The resin composition E1 was then put into an impregnation tank. A glass fiber cloth passed through the impregnation tank, and the resin composition E1 was adhered onto the glass fiber cloth. The resin composition E1 was then heated to form a prepreg of B-stage. Each of the prepregs had a resin content of about 55%. Five prepregs were stacked and laminated under vacuum at 210° C. for 2 hours to form a thermoset composition to measure its glass transition temperature (Tg, measured according to the standard IPC-TM-6502.4.24.4) and the Df loss at a frequency of 10 GHz and room temperature (Df, measured according to the standard JIS C2565).

Two copper foils and five prepregs were prepared, in which each of the prepregs had a resin content of about 55%. One copper foil, five prepregs, and another copper foil were sequentially stacked and laminated under vacuum at 210 for 2 hours to form a copper clad laminate. The copper clad laminate was cut as a rectangle sample with a width of 24 mm and a length of greater than 60 mm, and the surface copper foil was etched to keep a strip-shaped copper foil with a width of 3.18 mm and a length of greater than 60 mm. The peeling strength of the copper clad laminate to the copper foil was measured at room temperature (about 25° C.) by a universal tensile strength testing machine (according to the standard IPC-TM-650 2.4.8). The thermoset composition had Tg of 205° C. and Df of 0.0031. The peeling strength of the copper clad laminate to the copper foil was 3.32 lb/in.

Example 9

Example 9 was similar to Example 8, and the difference in Example 9 being that the copolymer P1 was replaced with the copolymer P2 to obtain the resin composition E2. The resin composition E2 was used to prepare the prepregs, the thermoset composition, and the copper clad laminate. The thermoset composition had Tg of 202° C. and Df of 0.0033. The peeling strength of the copper clad laminate to the copper foil was 3.34 lb/in.

Example 10

Example 10 was similar to Example 8, and the difference in Example 10 being that the copolymer P1 was replaced with the copolymer P3 to obtain the resin composition E3. The resin composition E3 was used to prepare the prepregs, the thermoset composition, and the copper clad laminate. The thermoset composition had Tg of 204° C. and Df of 0.0035. The peeling strength of the copper clad laminate to the copper foil was 3.54 lb/in.

Example 11

Example 11 was similar to Example 8, and the difference in Example 11 being that the copolymer P1 was replaced with the copolymer P4 to obtain the resin composition E4. The resin composition E4 was used to prepare the prepregs, the thermoset composition, and the copper clad laminate. The thermoset composition had Tg of 201° C. and Df of 0.0032. The peeling strength of the copper clad laminate to the copper foil was 3.70 lb/in.

Example 12

Example 12 was similar to Example 8, and the difference in Example 12 being that the copolymer P1 was replaced with the copolymer P5 to obtain the resin composition E5. The resin composition E5 was used to prepare the prepregs, the thermoset composition, and the copper clad laminate. The thermoset composition had Tg of 202° C. and Df of 0.0032. The peeling strength of the copper clad laminate to the copper foil was 3.46 lb/in.

Example 13

Example 13 was similar to Example 8, and the difference in Example 13 being that the copolymer P1 was replaced with the copolymer P6 to obtain the resin composition E6. The resin composition E6 was used to prepare the prepregs, the thermoset composition, and the copper clad laminate. The thermoset composition had Tg of 201° C. and Df of 0.0034. The peeling strength of the copper clad laminate to the copper foil was 3.47 lb/in.

Example 14

Example 14 was similar to Example 8, and the difference in Example 14 being that the copolymer P1 was replaced with the copolymer P7 to obtain the resin composition E7. The resin composition E7 was used to prepare the prepregs, the thermoset composition, and the copper clad laminate. The thermoset composition had Tg of 200° C. and Df of 0.0030. The peeling strength of the copper clad laminate to the copper foil was 3.3 lb/in.

The thermoset compositions and the copper clad laminates formed form the resin compositions E1 to E7 simultaneously had low Df (<0.004@10 GHz), high glass transition temperature (Tg ≥200° C.), and a high peeling strength to the copper foil (peeling strength ≥3.0 lb/in), in which Df could be 0.0031 to 0.0035 (@10 GHz), Tg could be 201° C. to 205° C., and the peeling strength to the copper foil could be 3.30 lb/in to 3.70 lb/in.

Comparative Example 6

Comparative Example 6 was similar to Example 8, and the difference in Comparative Example 6 being that the copolymer P1 was replaced with the copolymer P8 to obtain the resin composition C1. The resin composition C1 was used to prepare the prepregs, the thermoset composition, and the copper clad laminate. The thermoset composition had Tg of 191° C. and Df of 0.0038. The peeling strength of the copper clad laminate to the copper foil was 2.98 lb/in.

Comparative Example 7

Comparative Example 7 was similar to Example 8, and the difference in Comparative Example 7 being that the copolymer P1 was replaced with the copolymer P9 to obtain the resin composition C2. The resin composition C2 was used to prepare the prepregs, the thermoset composition, and the copper clad laminate. The thermoset composition had Tg of 204° C. and Df of 0.0042. The peeling strength of the copper clad laminate to the copper foil was 3.71 lb/in.

Comparative Example 8

Comparative Example 8 was similar to Example 8, and the difference in Comparative Example 8 being that the copolymer P1 was replaced with the copolymer P10 to obtain the resin composition C3. The resin composition C3 was used to prepare the prepregs, the thermoset composition, and the copper clad laminate. The thermoset composition had Tg of 198° C. and Df of 0.0034. The peeling strength of the copper clad laminate to the copper foil was 3.35 lb/in.

Comparative Example 9

Comparative Example 9 was similar to Example 8, and the difference in Comparative Example 9 being that the copolymer P11 was replaced with the copolymer P8 to obtain the resin composition C4. The resin composition C4 was used to prepare the prepregs, the thermoset composition, and the copper clad laminate. The thermoset composition had Tg of 204° C. and Df of 0.0032. The peeling strength of the copper clad laminate to the copper foil was 3.02 lb/in.

Comparative Example 10

Comparative Example 10 was similar to Example 8, and the difference in Comparative Example 10 being that the copolymer P11 was replaced with the copolymer P12 to obtain the resin composition C5. The resin composition C5 was used to prepare the prepregs, the thermoset composition, and the copper clad laminate. The thermoset composition had Tg of 185° C. and Df of 0.0041. The peeling strength of the copper clad laminate to the copper foil was 3.42 lb/in.

Comparative Example 11

24 g of terminal vinyl benzyl ether-containing polyphenylene oxide resin SA9000, 11 g of styrene, 6 g of polybutadiene-styrene Ricon100, 1 g of dimethyloltricyclodecane diacrylate EM2204, and 45 g of toluene were heated and stirred to dissolve. After the substances were completely dissolved, the solution was cooled to room temperature. 6 g of TAIC and 3 g of dicumyl peroxide were added into the solution and stirred until being completely dissolved to obtain resin composition C6 as varnish. The resin composition C6 was used to prepare the prepregs, the thermoset composition, and the copper clad laminate. The thermoset composition had Tg of 184° C. and Df of 0.0043. The peeling strength of the copper clad laminate to the copper foil was 3.05 lb/in.

The copolymer P8 had the benzene ring content that was too high and the vinyl group content that was too low. As such, the structure of the copolymer P8 was linear based, and the thermoset composition formed form the resin composition C1 in Comparative Example 6 had Tg of only 191° C. The copolymer P9 had the ester group content that was too high ($7.7*10^{-4}$ mol/g), such that Df of the thermoset composition formed form the resin composition C2 was obviously degraded (0.0042). The copolymer P10 had the benzene ring content that was too low, such that the thermoset composition formed form the resin composition C3 in Comparative Example 8 had Tg that was too low (<200° C.). The copolymer P11 was free of ester group, and the thermoset composition formed form the resin composition C4 in Comparative Example 9 had a peeling strength to the copper foil of only 3.02 lb/in. The copolymer P12 had the benzene ring content that was too low, such that the thermoset composition formed form the resin composition C5 in Comparative Example 10 had Tg that was obviously decreased (<190° C.) and Df of about 0.0041. Comparative Example 11 was free of copolymer, and compounds were directly thermally cured with the polyphenylene oxide resin to form the resin composition, and the thermoset composition formed form the resin composition had the obviously poor properties.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A vinyl-containing copolymer, being copolymerized from
   (a) first compound, (b) second compound, and (c) third compound,
   wherein (a) first compound is an aromatic compound having a single vinyl group;
   (b) second compound is polybutadiene or polybutadiene-styrene having side vinyl groups; and
   (c) third compound is an acrylate compound,
   wherein the vinyl-containing copolymer includes 0.003 mol/g to 0.012 mol/g of benzene ring, 0.0005 mol/g to 0.012 mol/g of vinyl group, and $1*10-5$ mol/g to $2.8*10-4$ mol/g of ester group.

2. The vinyl-containing copolymer as claimed in claim 1, wherein (a) first compound has a chemical structure of

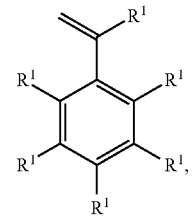

wherein each of $R^1$ is independently H or $C_{1-10}$ alkyl group.

3. The vinyl-containing copolymer as claimed in claim 1, wherein (b) second compound has a chemical structure of

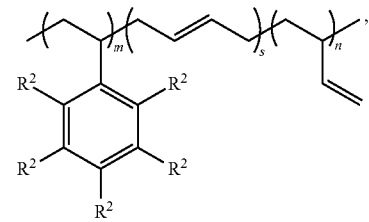

wherein each of $R^2$ is independently H or $C_{1-10}$ alkyl group, m is 0 to 50, s is 0 to 100, and n is 1 to 100,
   wherein (b) second compound has a number average molecular weight of 300 to 15000.

4. The vinyl-containing copolymer as claimed in claim 1, wherein (c) third compound has a chemical structure of

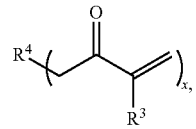

wherein $R^3$ is H or methyl group, x is 1 to 3, and $R^4$ is

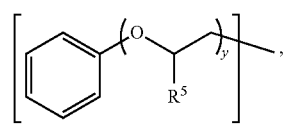

-continued

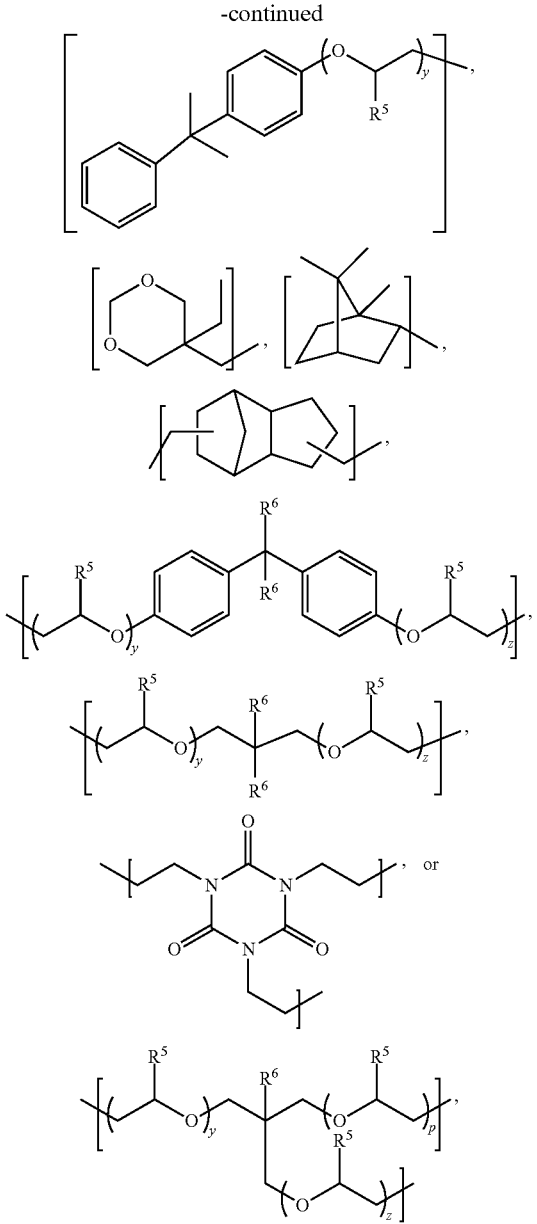

or wherein each of $R^5$ and $R^6$ is independently H or $C_{1-10}$ alkyl group, y is 1 to 10, z is 0 to 10, and p is 0 to 10.

5. A resin composition, comprising:
a vinyl-containing copolymer and a radical initiator;
wherein the vinyl-containing copolymer is copolymerized from (a) first compound, (b) second compound, and (c) third compound, wherein
(a) first compound is an aromatic compound having a single vinyl group;
(b) second compound is polybutadiene or polybutadiene-styrene having side vinyl groups; and
(c) third compound is an acrylate compound, and
the vinyl-containing copolymer includes 0.003 mol/g to 0.012 mol/g of benzene ring, 0.0005 mol/g to 0.012 mol/g of vinyl group, and 1*10−5 mol/g to 2.8*10−4 mol/g of ester group.

6. The resin composition as claimed in claim 5, wherein (a) first compound has a chemical structure of

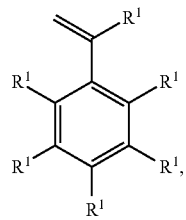

wherein each of $R^1$ is independently H or $C_{1-10}$ alkyl group.

7. The resin composition as claimed in claim 5, wherein (b) second compound has a chemical structure of

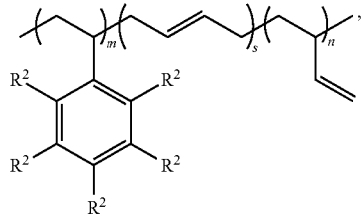

wherein each of $R^2$ is independently H or $C_{1-10}$ alkyl group, m is 0 to 50, s is 0 to 100, and n is 1 to 100,
wherein (b) second compound has a number average molecular weight of 300 to 15000.

8. The resin composition as claimed in claim 5, wherein (c) third compound has a chemical structure of

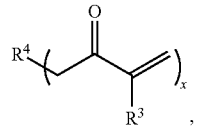

wherein $R^3$ is H or methyl group, x is 1 to 3, and $R^4$ is

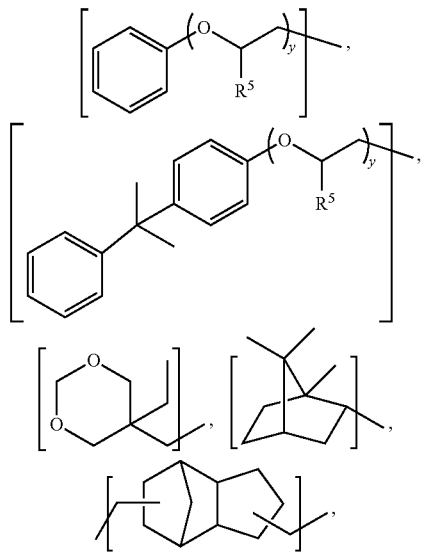

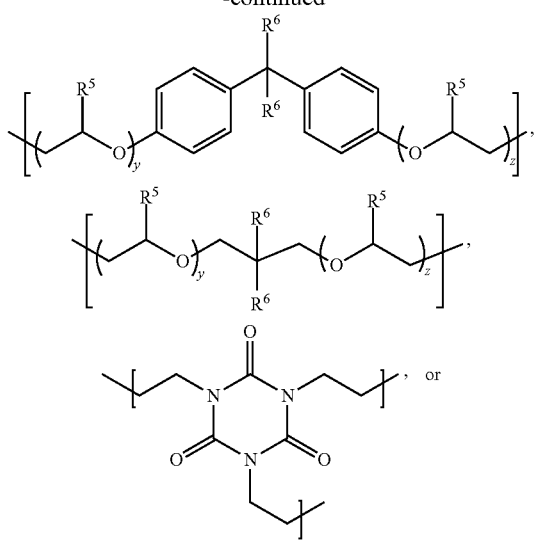

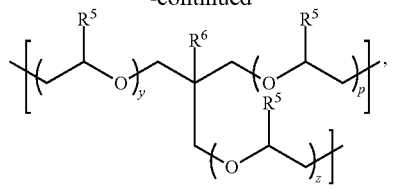

wherein each of $R^5$ and $R^6$ is independently H or $C_{1-10}$ alkyl group, y is 1 to 10, z is 0 to 10, and p is 0 to 10.

9. The resin composition as claimed in claim 5, further comprising a terminal double bond-containing polyphenylene oxide resin, and the vinyl-containing copolymer and the terminal double bond-containing polyphenylene oxide resin have a weight ratio of 90:10 to 10:90.

10. The resin composition as claimed in claim 9, wherein the terminal double bond-containing polyphenylene oxide resin comprises terminal methacryloxy group-containing polyphenylene oxide resin, terminal vinyl benzyl ether-containing polyphenylene oxide resin, or a combination thereof.

* * * * *